United States Patent

[11] 3,588,164

[72] Inventor Melvin James Wheeler
930 Crestview Drive, Farmington, N. Mex. 87401
[21] Appl. No. 847,158
[22] Filed Aug. 4, 1969
[45] Patented June 28, 1971

[54] PIPE HANDLING CRADLE
9 Claims, 6 Drawing Figs.
[52] U.S. Cl. .................................................. 294/74, 214/1
[51] Int. Cl. ....................................................... B66c 1/18
[50] Field of Search............................................ 294/74, 75, 76, 81, 67.4 (B), 67.5, 67.5 (A); 193/35, 35 (F); 214/1 (PL), 1 (P)

[56] References Cited
UNITED STATES PATENTS
| | | | |
|---|---|---|---|
| 1,877,974 | 9/1932 | Robb............................ | 214/1(PL) |
| 3,036,372 | 5/1962 | Vigneron...................... | 214/1(PL) |

Primary Examiner—Harvey C. Hornsby
Assistant Examiner—Merle F. Maffel
Attorney—Sheridan, Ross and Burton ABSTRACT: A cradle or sling for supporting pipe lines during their fabrication characterized by a plurality of longitudinally spaced cradle sections each formed of a plurality of roller supporting frames, the frames being link connected in such manner to permit them to conform to pipes of various diameters, the sections being link connected to permit them to conform to a longitudinal curve in the pipe and the sections being interconnected by a cable system to permit them to move relatively in a vertical direction.

PATENTED JUN 28 1971

3,588,164

INVENTOR.
Melvin James Wheeler
BY
Sheridan, Ross & Burton
ATTORNEYS

PIPE HANDLING CRADLE

BACKGROUND OF THE INVENTION

In the laying of pipe lines it is common practice to support the pipe sections above the ground by a crane-supported cradle or sling, weld the ends together, and wrap same with a protecting cover prior to lowering the line to its final position of repose which may be a ditch to subsequently be filled with earth. Such sections may be either straight or curved and the crane normally moves relatively to the pipe line as it progresses in length. It has long been the practice to construct the pipe of thick wall low carbon steel of relatively low tensile strength. Such pipe, however, is subject to corrosion and the present trend is toward the use of thinner wall high carbon steel which, due to its increased brittleness, has created problems with conventional cradles in that their lack of uniform distribution of weight to same has caused creasing of the pipe and sometimes actually rupturing of same, particularly as the cradle traverses a curved section in the pipe line.

SUMMARY OF THE INVENTION

The present invention obviates the disadvantages just referred to by the provision of a plurality of cradle sections, each formed of a plurality of frames disposed around the pipe and carrying rollers engaging the pipe, the frames being link connected together to conform to pipes of various diameters, the sections being link connected together to permit them to move around a longitudinal curve in the pipe and the sections being connected together with sheaves and a cable to permit relative vertical movement between the sections, thus resulting in a cradle support to which load is uniformly distributed, without high concentrated load which could crease, rupture or otherwise damage the pipe during the handling of same in laying a pipe line.

It is, accordingly, a principal objective of this invention to provide an improved cradle to which the load is uniformly applied, in contradistinction to nonuniform application of the load and with unduly high load concentrations, which thus maintains a support applied over a considerable area and prevents unduly high load concentrations which stress the pipe beyond its elastic limit. While the cradle is of improved utility along a straight run of pipe it is particularly advantageous when traversing a curved section where heretofore it has been difficult to avoid unduly high stresses in the pipe.

Other objectives, advantages and salient features will become apparent from the detailed description, the appended claims, and the accompanying drawing to now be briefly described.

DESCRIPTION OF PREFERRED EMBODIMENTS

Figure 1:
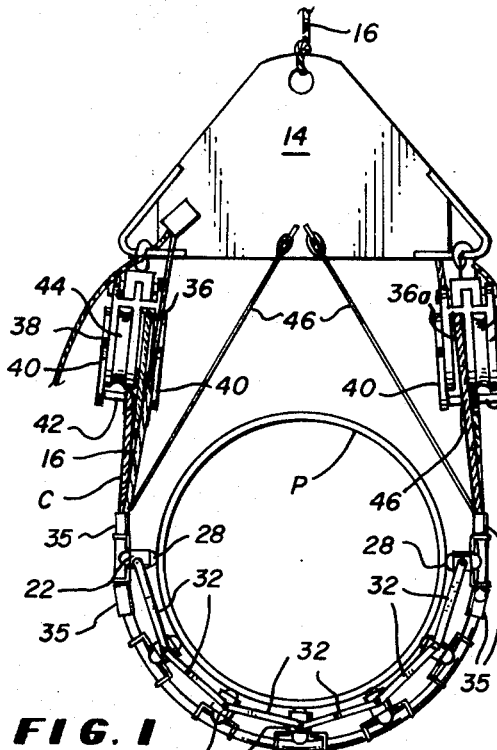
FIG. 1 is an end elevation of the subject of the invention, certain repetitive portions being omitted.
Figure 2:
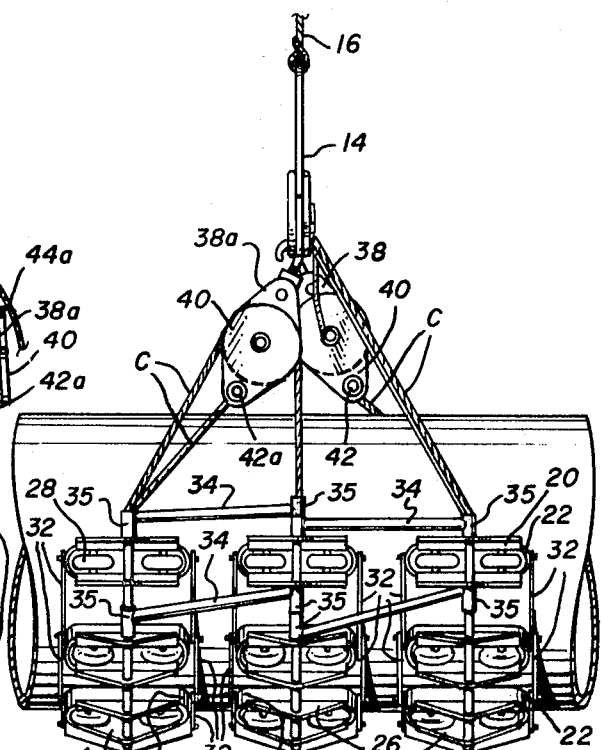
FIG. 2 is a side elevation of same.

Referring now to the drawing, and particularly FIGS. 1 and 2 which are illustrative of one embodiment of the invention, the invention comprises, in general, a central cradle or sling section 10 and like adjacent sections 12, 12a which are supported by an A-frame or bar 14, secured to a crane (not shown) by a cable 16, a cable system to subsequently be described in detail being connected between ends of the A-frame and the three cable sections.

Figure 3:
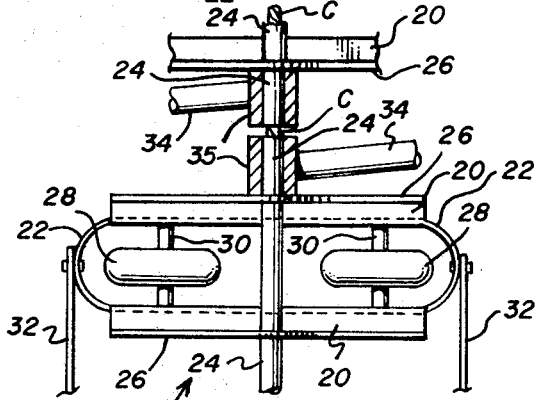
FIG. 3 is a plan of one of a plurality of roller support members.
Figure 4:
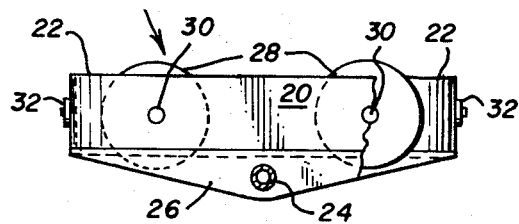
FIG. 4 is a side elevation of FIG. 3.
Figure 5:
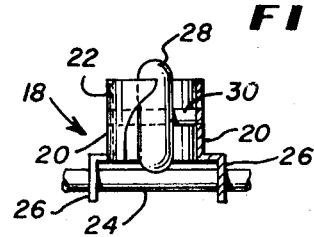
FIG. 5 is an end elevation of FIG. 4, a portion being broken away.

Each cradle section is formed of a plurality of like idler roller supports or frames 18, one of which is shown in detail in FIGS. 3, 4 and 5. This comprises a pair of parallel spaced members 20, 20 connected together at their ends by end members 22, 22, forming an open generally box section frame. A tube 24 is secured, such as by welding, to members 20, 20 midway between their ends, and as illustrated, such tube extends through a pair of stiffening gusset plates 26, 26 welded to members 20, 20. A pair of idler rollers 28, 28 are journally supported by cross pins 30, 30, each roller being disposed between tube 24 and an end of frame 18. The peripheral pipe contacting surfaces of the rollers are preferably convex, as best shown in FIGS. 3 and 5 and are constructed of resilient material, such as hard rubber or the like.

The idler roller supports just described are disposed around the lower portion of a pipe P and maintained in spaced relation by links 32, the ends of which are pivotally connected to ends 22 of frames 18. As will be apparent, this articulated connection permits the various idler roller frames to move relatively and conform to pipes of various diameters.

As best shown in FIG. 2, the sections 10, 12, 12a are connected together by links 34 extending between the ends of tubes 24 of each frame 18, the end 35 of each link being tubular and loosely surrounding the ends of adjacent tubes 24. This provides means for maintaining the three sections in longitudinal spaced relationship and also provides an articulated connection which permits the section to move relatively as the sections pass around a curved portion of pipe P. FIG. 2 illustrates only four links 34 in the interest of simplification of the drawing but it is to be understood that like links extend between all tubes 24 of the various frames 18.

Figure 6:
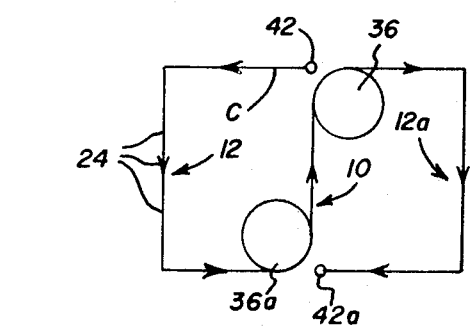
FIG. 6 diagrammatically depicts the manner of training or reeving a cable through various parts of the device.

It is also desired that the three sections be permitted to move relatively in a vertical direction to thereby maintain uniform load on same during changes of angular attitude of pipe P with respect to the ground, such as when lifted or lowered. This is attained by the manner in which cable C is trained or reeved about sheaves 36, 36a and through tubes 24, best shown diagrammatically in FIG. 6, and structurally in FIGS. 1 and 2. With reference first to FIGS. 1 and 2, sheaves support blocks 38, 38a are provided with side plates 40, 40 and cross pins 42, 42a to which the ends of the cable are attached. Referring now to FIG. 6, the cable C attached to pin 42 extends angularly outward and downward to one end of the circumferentially extending tubes 24 in section 12 and thence out of their other end. It then extends to rotatable sheave 36a carried by sheave block 38a and thence vertically downward and through the tubes 24 of section 10 and around sheave 36. It then extends angularly outward and downward through tubes 24 of section 12a and thence back to its other point of affixion on pin 42a. Otherwise stated, central section 10 is suspended by a pair of vertically extending cable portions and sections 12, 12a are each suspended by a pair of angularly extending cable portions but since the portions referred to are all part of one cable which may move relative to the three sections, the three sections may move relatively in a vertical direction and thus distribute the load uniformly to the three sections.

As best shown in FIG. 1, each sheave block 38, 38a rotatably carries a second sheave 44, 44a which is redundant in the construction illustrated. This, however, has a purpose to now be set forth. As pipe size and weight increase it has been found desirable to add a pair of additional sections, one adjacent each of section 12, 12a. A second cable is then employed having its ends affixed to sheave blocks 38, 38a with outwardly angular runs supporting the added sections and interconnected to permit same to vertically float relative to the three sections illustrated in a like manner to that described for the illustrated three sections.

Referring again to FIG. 1, a pair of relatively small stabilizing cables 46 are preferably provided, each being connected at its upper end to A-frame 14 and at its lower end to the upper end of the central section 10. These have been found desirable to obviate the tendency of the cradle sections to rotate circumferentially about the pipe as they traverse a curve in same.

In a variation of the invention (not shown) the ends of cable C are affixed directly to A-frame 14, rather than to the sheave blocks, which construction operates in a satisfactory manner and is thus contemplated within the purview of the invention. The construction illustrated, however, operates in an improved manner and is thus preferred.

I claim:

1. Apparatus for supporting a pipe line and moveable along same as the pipe line progresses in length, comprising:
   A. a pipe cradle including a central set of idler roller support members adapted to be disposed about the lower portion of a pipe to be supported and like sets disposed longitudinally at each side of same;
      a. each idler roller support member comprising spaced side members connected at their ends by end members;
      b. a transverse tubular member affixed to the side members of each idler support member substantially midway between its ends for receiving a cable therewithin adapted to be disposed around the lower portion of the pipe;
      c. a pair of idler rollers, each being disposed between the side members and between a tubular member and an end member supported for rotation about an axis substantially parallel to the cable whereby the rollers may roll longitudinally along the pipe;
   B. links extending in a direction around the pipe pivotally connecting the end members of a set together, whereby each set may conform to pipes of various diameters;
   C. links extending in a longitudinal direction of the pipe pivotally connected at their ends to the support members of adjacent sets for permitting the sets to move relatively to conform to a longitudinal curve in the pipe;
   D. a common support disposed above the central set adapted to be connected to a supporting boom, or the like, having ends disposed above the upper ends of the central set including a sheave rotatably carried by a sheave block disposed at each end of the common support; and
   E. a cable having one end affixed to the common support, thence trained through the tubular members of one of said like sets, thence trained over one of the sheaves, thence through the tubular members of the central set, thence trained over the other sheave, thence trained through the tubular members of the other of said like sets, and thence trained to the common support where its other end is affixed.

2. Apparatus in accordance with claim 1 wherein one end of the cable is affixed to one sheave block and the other end to the other sheave block.

3. Apparatus in accordance with claim 1 wherein said links extending in the longitudinal direction are pivotally connected at their ends to said tubular members.

4. Apparatus in accordance with claim 1 including a second sheave carried by each sheave block over which a cable may be attained for supporting an additional set disposed adjacent each of said like sets.

5. Apparatus in accordance with claim 1 including stabilizing members disposed between said common support and upper ends of said central set for obviating tendency of the sets to rotate relative to the pipe as the sets traverse a curve in same.

6. Apparatus in accordance with claim 1 wherein the outer surfaces of said idler rollers are convex.

7. Apparatus in accordance with claim 1 wherein said rollers are constructed of nonmetallic resilient material adapted to deform without producing creases in the pipe.

8. Apparatus for supporting a pipe line and moveable along same as the pipe line progresses in length, comprising:
   A. a pipe cradle including a set of idler roller support members adapted to be disposed about the lower portion of a pipe to be supported;
      a. each support member rotatably supporting idler roller means adapted to roll along the pipe;
      b. a cable guide for each support member for maintaining a cable portion about the pipe in a plane perpendicular to the pipe;
   B. links extending in a direction around the pipe for pivotally connecting the support members together and maintaining same in angularly spaced relationship, but permitting same to conform to pipes of various diameters; and
   C. a supporting cable engaging said cable guides adapted to change in shape with variations in diameter of the pipe.

9. Apparatus in accordance with claim 8 including at least one like longitudinally spaced adjacent set of support members, links extending in the longitudinal direction of the pipe pivotally connected at their ends to the adjacent support members of the sets for permitting the sets to move relatively to conform to a longitudinal curve in the pipe, a common support for the cable, and means for equally distributing the load to the adjacent sets.